UNITED STATES PATENT OFFICE.

WILHELM HIEMENZ AND ERICH RIETZ, OF ELBERFELD, GERMANY, ASSIGNORS TO FARBENFABRIKEN VORM. FRIEDR. BAYER & CO., OF ELBERFELD, GERMANY, A CORPORATION OF GERMANY.

ALOIN ESTER.

989,974.      Specification of Letters Patent.      Patented Apr. 18, 1911.

No Drawing.      Application filed December 19, 1910. Serial No. 598,044.

*To all whom it may concern:*

Be it known that we, WILHELM HIEMENZ and ERICH RIETZ, doctors of philosophy, chemists, citizens of the German Empire, residing at Elberfeld, Germany, have invented new and useful Improvements in New Aloin Esters, of which the following is a specification.

Aloin possesses as is known valuable purgative or laxative properties. But its disagreeable taste renders it objectionable for use.

We have now found that the hitherto unknown mixed esters of aloin with acetic acid and formic acid do not suffer from the above mentioned disadvantage. The new esters contain most probably 2 radicals of formic acid and 3 radicals of acetic acid, or 1 radical of formic acid and 3 radicals of acetic acid. They are after being dried and pulverized yellowish powders easily soluble in dilute caustic alkalis, glacial acetic acid, benzene, acetone, and hot alcohol. In contradistinction to free aloin they give no coloration with ferric chlorid. An average dose as a laxative is about 0.1 gram. while about 0.2 gram is given as a purgative.

The process for the production of the new compounds consists in treating aloin with a mixture of acetic acid anhydrid and formic acid or with the anhydrid of acetic acid with formic acid.

In order to illustrate the new process more fully the following examples are given, the parts being by weight:—

Example 1: 50 parts of aloin are heated to about 100° C. during ¼ to ½ hours together with a mixture prepared from 210 parts of acetic acid anhydrid, 90 parts of a 100 per cent. formic acid which mixture has been heated to 50° C. and 5 parts of molten chlorid of zinc. The limpid solution thus obtained is then introduced into 5000 parts of ice water. The precipitate is filtered off, washed, redissolved in hot alcohol and reprecipitated by introducing the alcoholic solution into ice-water. It is filtered off again and dried.

Example 2: 50 parts of aloin are dissolved in 200 parts of acetic-formic acid anhydrid of the formula:

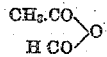

with the addition of 5 parts of zinc chlorid, the mixture is heated to 100° C. until a solution results and the new ester is isolated as is described in Example 1.

We claim:—

The herein described new esters of aloin with formic acid and acetic acid, which are after being dried and pulverized yellowish powders, soluble in dilute caustic alkalis, glacial acetic acid, benzene and hot alcohol, giving no coloration with ferric chlorid; and being valuable purgatives, substantially as described.

In testimony whereof we have hereunto set our hands in the presence of two subscribing witnesses.

WILHELM HIEMENZ. [L. S.]
    ERICH RIETZ.     [L. S.]

Witnesses:
  CHAS. J. WRIGHT,
  WALTER VONNEGUT.